United States Patent
An et al.

(10) Patent No.: US 11,269,286 B2
(45) Date of Patent: Mar. 8, 2022

(54) FREE STOP BASED HINGE APPARATUS

(71) Applicant: Hewlett-Packard Development Company, L.P., Spring, TX (US)

(72) Inventors: Hwikyeong An, Suwon-si (KR); Suwhan Kim, Suwon-si (KR); Jinho Park, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 54 days.

(21) Appl. No.: 16/500,484

(22) PCT Filed: May 10, 2018

(86) PCT No.: PCT/KR2018/005339
§ 371 (c)(1),
(2) Date: Oct. 3, 2019

(87) PCT Pub. No.: WO2019/074179
PCT Pub. Date: Apr. 18, 2019

(65) Prior Publication Data
US 2021/0109477 A1    Apr. 15, 2021

(30) Foreign Application Priority Data

Oct. 12, 2017 (KR) .......................... 10-2017-0132048

(51) Int. Cl.
G03G 21/16 (2006.01)
F16C 11/04 (2006.01)
G03G 15/00 (2006.01)
G06F 1/16 (2006.01)

(52) U.S. Cl.
CPC .......... *G03G 21/1647* (2013.01); *F16C 11/04* (2013.01); *G03G 15/5016* (2013.01); *G06F 1/1681* (2013.01)

(58) Field of Classification Search
CPC ...... F16C 1/04; E05Y 2800/45; Y10T 16/557; Y10T 16/54038; Y10T 16/5403; E05D 11/081; G06F 1/1681; G06F 1/1616
See application file for complete search history.

(56) References Cited

U.S. PATENT DOCUMENTS 1,956,040 A * 4/1934 Meyer
3,349,427 A * 10/1967 Cairns ...................... E05D 5/12
16/273
4,101,227 A * 7/1978 Herbenar ................. B62D 7/16
403/27

(Continued)

FOREIGN PATENT DOCUMENTS

JP  2000045615 A * 2/2000
JP  2001107941 A   4/2001

(Continued)

*Primary Examiner* — Nictor D Batson
*Assistant Examiner* — Matthew J Sullivan
(74) *Attorney, Agent, or Firm* — Jefferson IP Law, LLP

(57) ABSTRACT

A hinge apparatus is provided. The hinge apparatus includes a rotation axis device configured to pivotably support a part of a display, and a free stop hinge device configured to pivotably support an other part of the display coaxially spaced apart from the part of the display. The rotation axis device includes a curved protrusion for controlling an eccentricity between a central axis line of the rotation axis device and a central axis line of the free stop hinge device.

12 Claims, 14 Drawing Sheets

(56) References Cited

U.S. PATENT DOCUMENTS

| | | | | |
|---|---|---|---|---|
| 4,620,344 A * | 11/1986 | Lewis, Jr. | ............... | E05C 17/32 16/337 |
| 5,075,929 A * | 12/1991 | Chung | | |
| 5,206,790 A * | 4/1993 | Thomas | ................. | F16M 11/10 16/342 |
| 5,239,731 A * | 8/1993 | Lu | ......................... | E05D 11/081 16/340 |
| 5,715,576 A * | 2/1998 | Liu | | |
| 5,813,789 A | 9/1998 | Prickler et al. | | |
| 6,065,732 A * | 5/2000 | Cho | ...................... | G06F 1/1616 248/371 |
| 6,101,676 A * | 8/2000 | Wahl et al. | | |
| 6,308,377 B1 | 10/2001 | Maatta | | |
| 6,381,808 B1 * | 5/2002 | Kida | | |
| 6,532,628 B2 * | 3/2003 | Kim | ...................... | G06F 1/1601 16/342 |
| 6,568,034 B2 * | 5/2003 | Cho | | |
| 6,701,572 B2 * | 3/2004 | Bechthold | ............ | E05D 7/0045 16/235 |
| 6,711,001 B2 * | 3/2004 | Hernandez | .............. | G06F 1/181 248/568 |
| 6,711,781 B2 * | 3/2004 | Hsiu | .................. | G06F 1/1616 16/266 |
| 7,096,534 B2 * | 8/2006 | Wang | ................. | H04M 1/0216 16/284 |
| 7,832,054 B2 * | 11/2010 | Nakasone | | |
| 8,209,816 B2 * | 7/2012 | Heger | ..................... | B60R 1/076 16/334 |
| 8,251,341 B2 * | 8/2012 | Wang | ................... | F16M 11/16 248/688 |
| 8,254,103 B2 * | 8/2012 | Park | ...................... | G06F 1/1681 361/679.27 |
| 8,307,516 B2 * | 11/2012 | Bartnick | ................ | B60N 3/026 16/438 |
| 8,474,771 B2 * | 7/2013 | Ross | ...................... | A61B 50/20 248/276.1 |
| 8,720,845 B2 * | 5/2014 | Courbon | ............... | B60R 1/0617 248/479 |
| 8,806,717 B2 * | 8/2014 | Scheck et al. | | |
| 8,959,717 B2 * | 2/2015 | Billings | .............. | E05D 11/1028 16/334 |
| 9,388,617 B2 * | 7/2016 | Onda | | |
| 9,731,655 B2 * | 8/2017 | Nakasone | ................. | B60R 7/06 |
| 9,926,970 B2 * | 3/2018 | Lang | ....................... | F16C 11/04 |
| 10,071,662 B2 * | 9/2018 | Choi | .................... | E05D 11/0054 |
| 10,267,077 B2 * | 4/2019 | Nishida | .................... | F16C 11/04 |
| 10,605,309 B2 * | 3/2020 | Winter | ................... | F16C 23/046 |
| 10,625,105 B2 * | 4/2020 | Hetrich | ............. | A62B 35/0037 |
| 10,641,025 B2 * | 5/2020 | Stuart | ....................... | E05F 3/20 |
| 2002/0112319 A1 * | 8/2002 | Kida | ..................... | G06F 1/1681 16/342 |
| 2006/0130278 A1 * | 6/2006 | Chen et al. | | |
| 2006/0175501 A1 | 8/2006 | Richter | | |
| 2006/0216977 A1 * | 9/2006 | Kato | ................... | H04M 1/0235 439/157 |
| 2006/0262496 A1 * | 11/2006 | Lee | ....................... | G06F 1/1681 361/679.27 |
| 2006/0272128 A1 * | 12/2006 | Rude | ..................... | E05D 11/084 16/342 |
| 2006/0272129 A1 * | 12/2006 | Rude | ..................... | E05D 11/082 16/342 |
| 2009/0038119 A1 * | 2/2009 | Rude | ..................... | G06F 1/1681 16/342 |
| 2010/0077565 A1 * | 4/2010 | Huang | .................... | E05D 5/121 16/342 |
| 2010/0313384 A1 * | 12/2010 | Nakasone | | |
| 2011/0061197 A1 * | 3/2011 | Shimomura | ........ | H04M 1/0216 16/303 |
| 2012/0023704 A1 * | 2/2012 | Case | ..................... | G06F 1/1616 16/321 |
| 2013/0111706 A1 * | 5/2013 | Anderson | .............. | B60N 2/793 16/342 |
| 2016/0153222 A1 * | 6/2016 | Hu | ........................ | G06F 1/1681 361/679.55 |
| 2017/0319880 A1 * | 11/2017 | Yang | ................... | A62B 35/0025 |
| 2018/0266479 A1 * | 9/2018 | Parker | .................... | F16C 11/068 |
| 2019/0367174 A1 * | 12/2019 | Mertes | .................... | B64D 27/26 |

FOREIGN PATENT DOCUMENTS

| | | |
|---|---|---|
| JP | 2002372033 A | 12/2002 |
| KR | 1020040065556 A | 7/2004 |
| KR | 101113712 B1 * | 2/2012 |

\* cited by examiner

[Fig. 1]
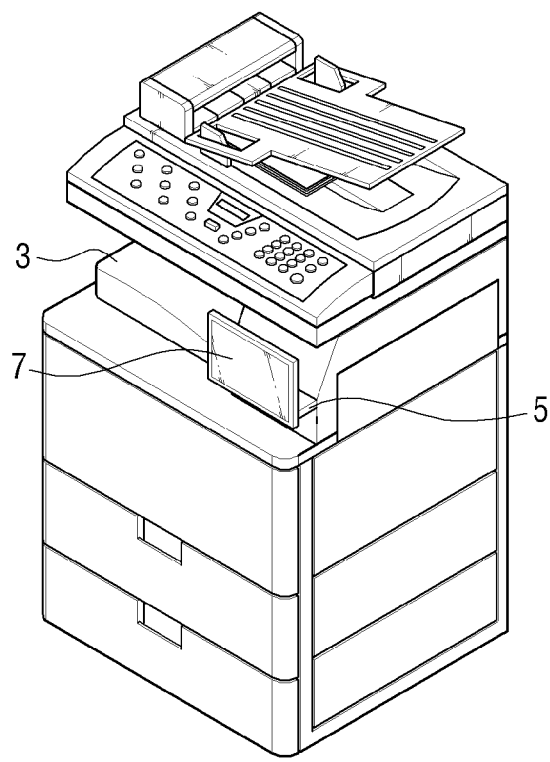
[Fig. 2]
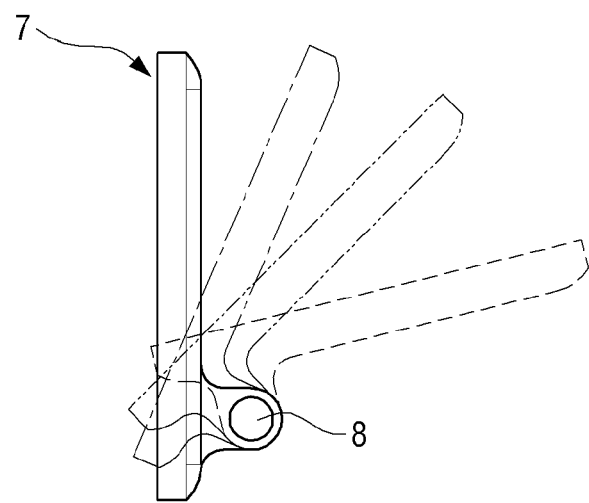

[Fig. 3]
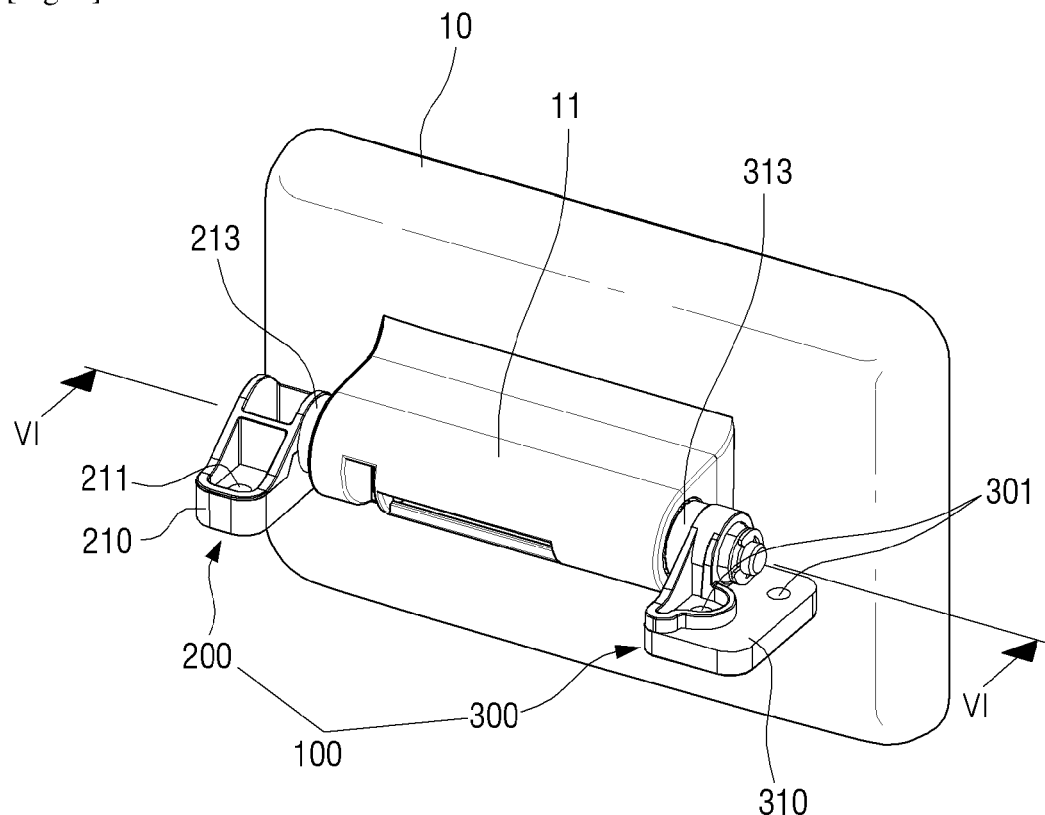

[Fig. 4]
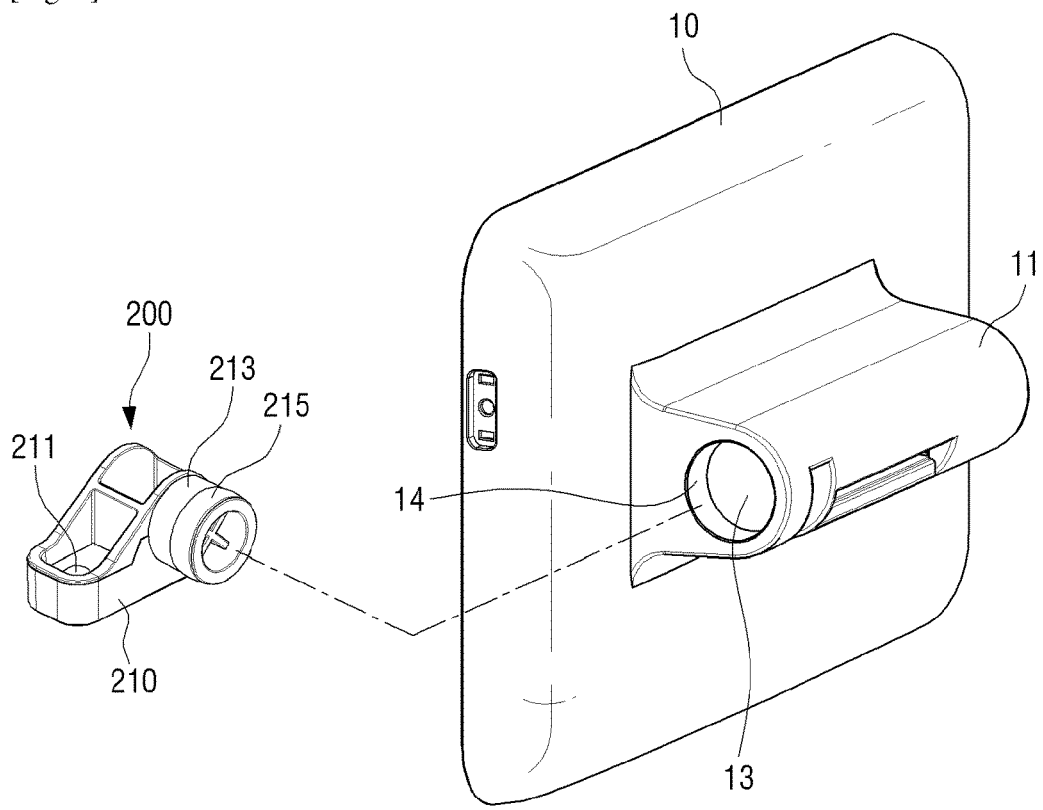
[Fig. 5]
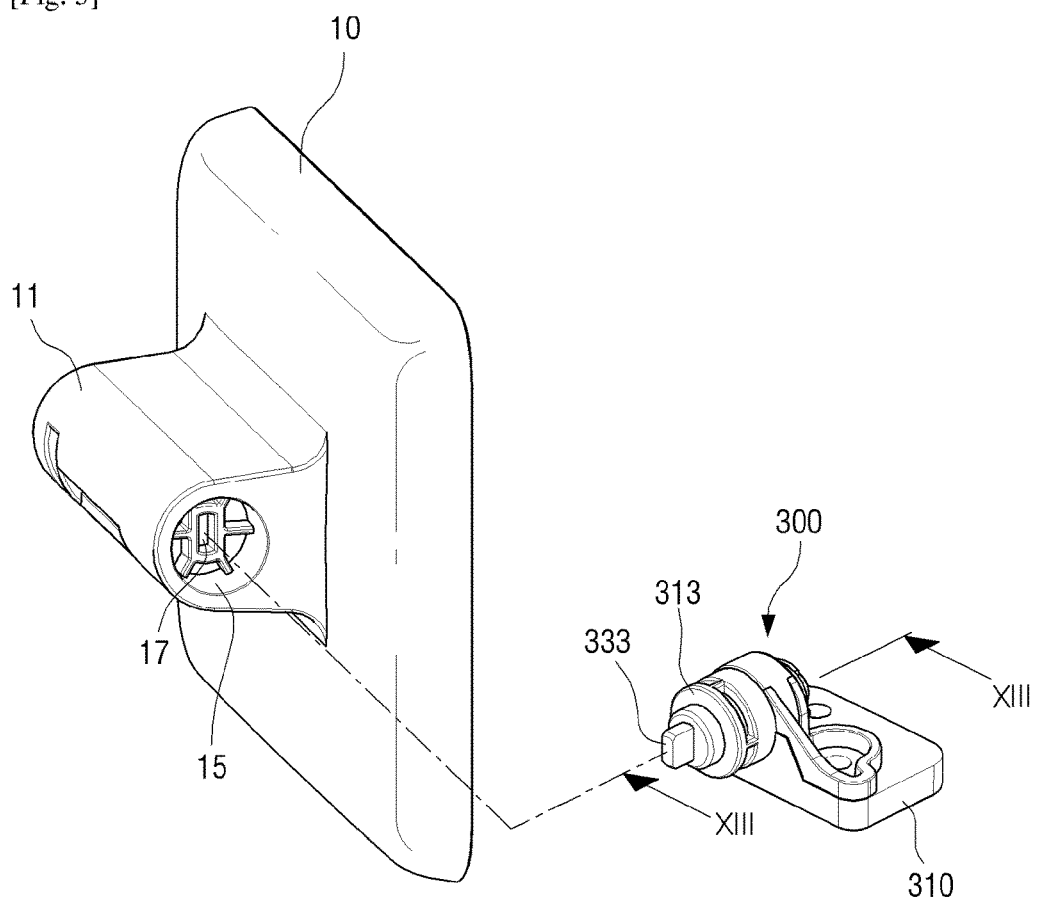

[Fig. 6]
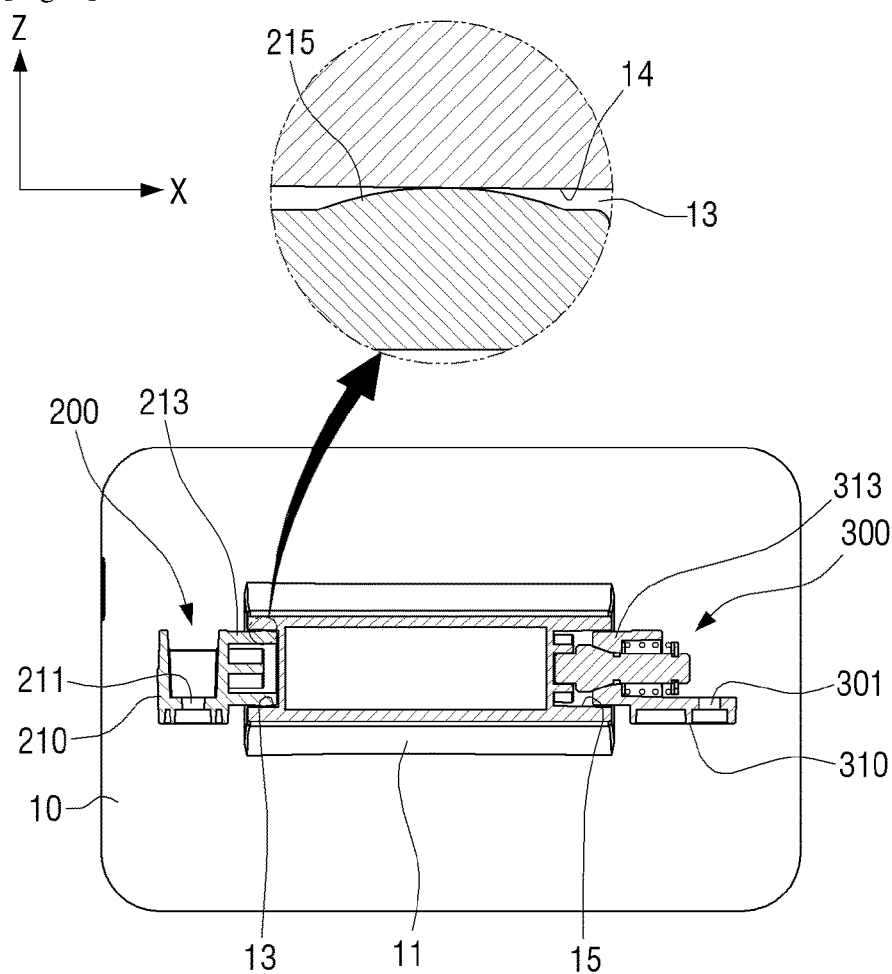
[Fig. 7]
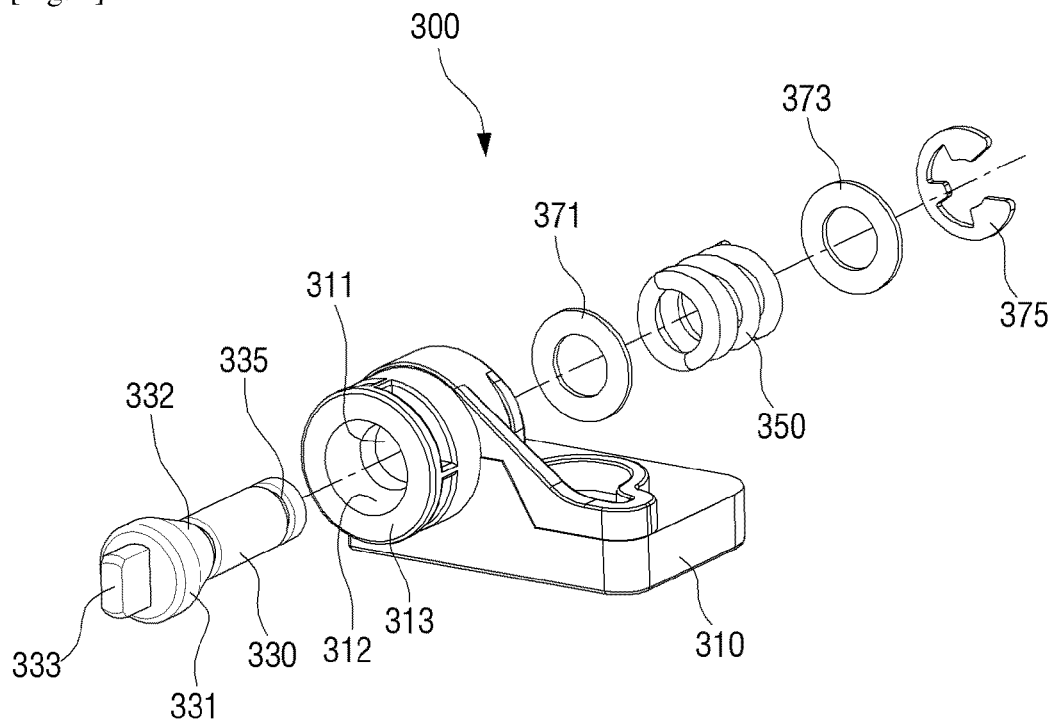

[Fig. 8]
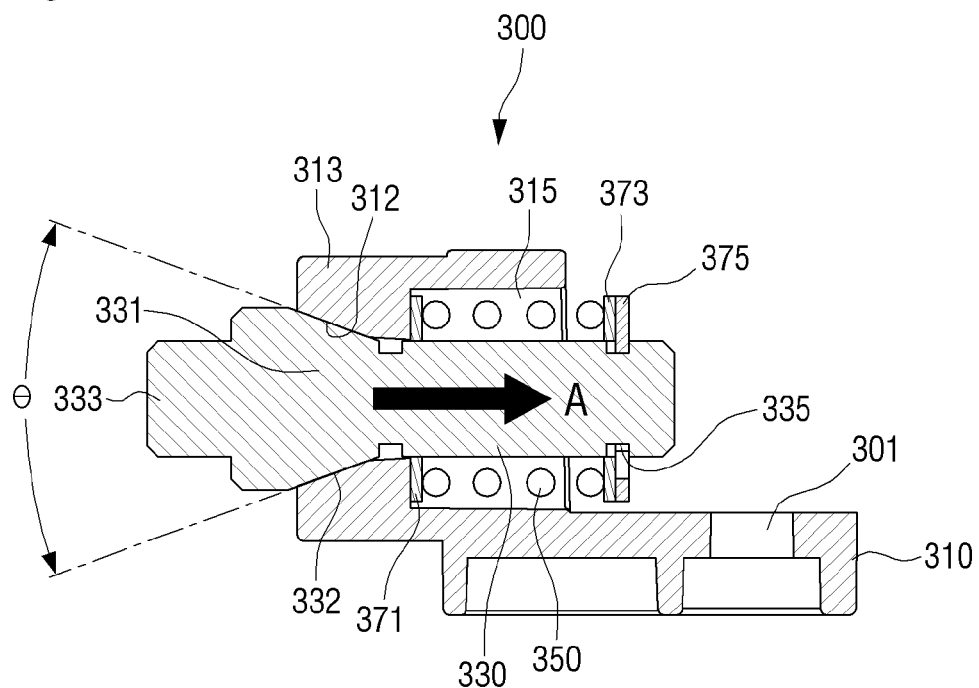
[Fig. 9]
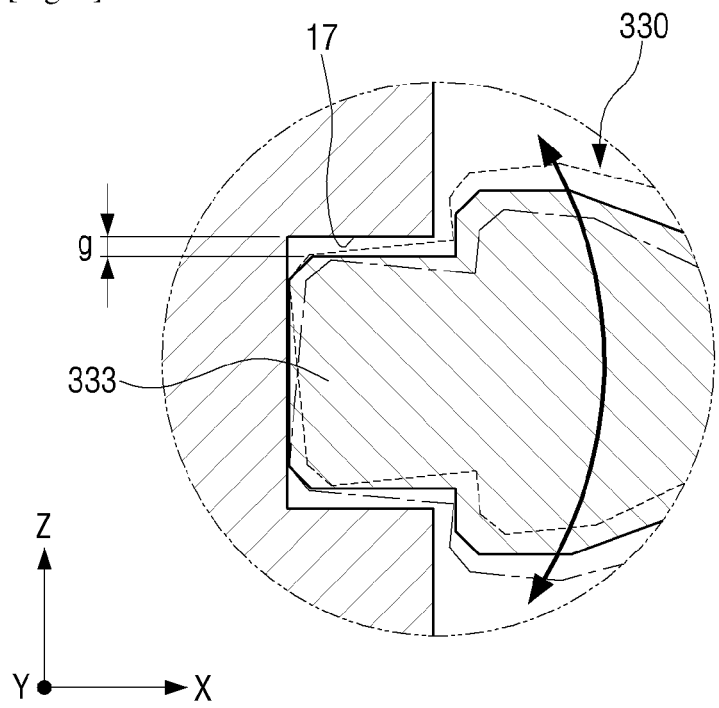

[Fig. 10]
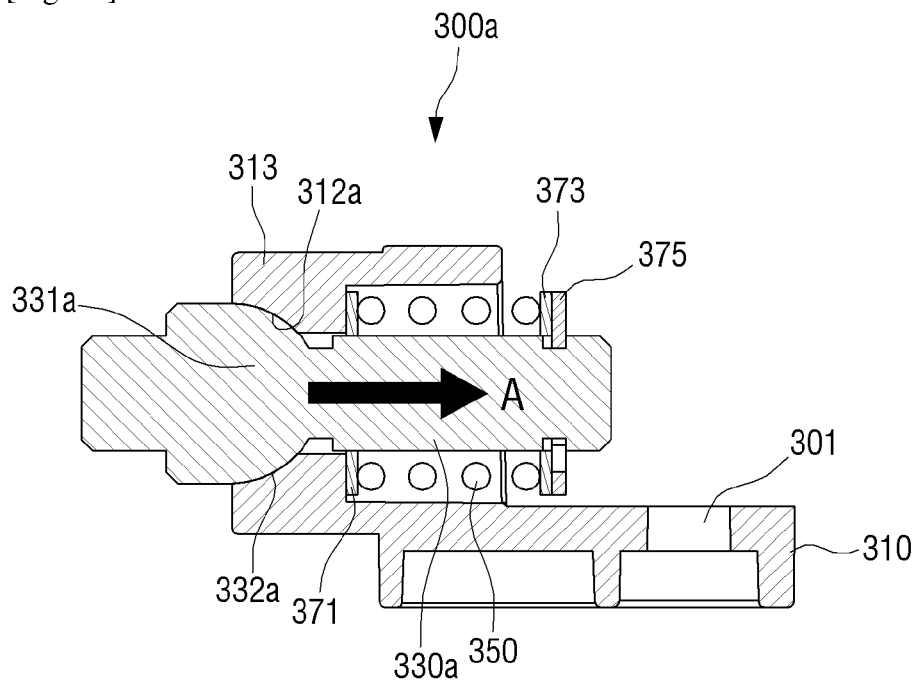
[Fig. 11]
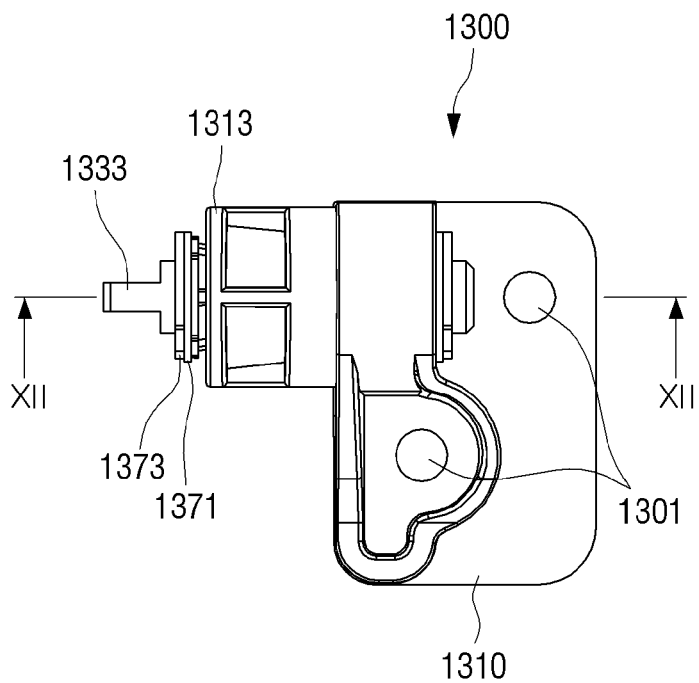

[Fig. 12]
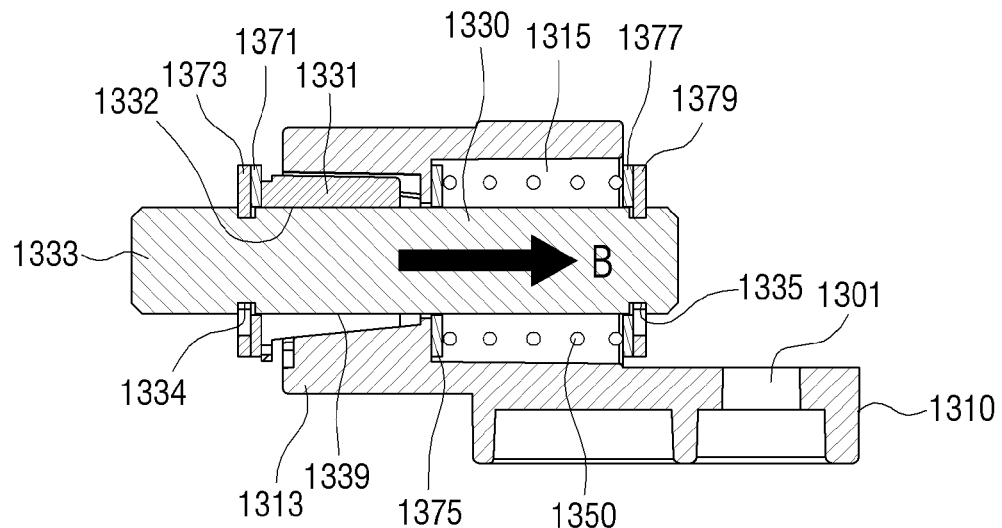
[Fig. 13]
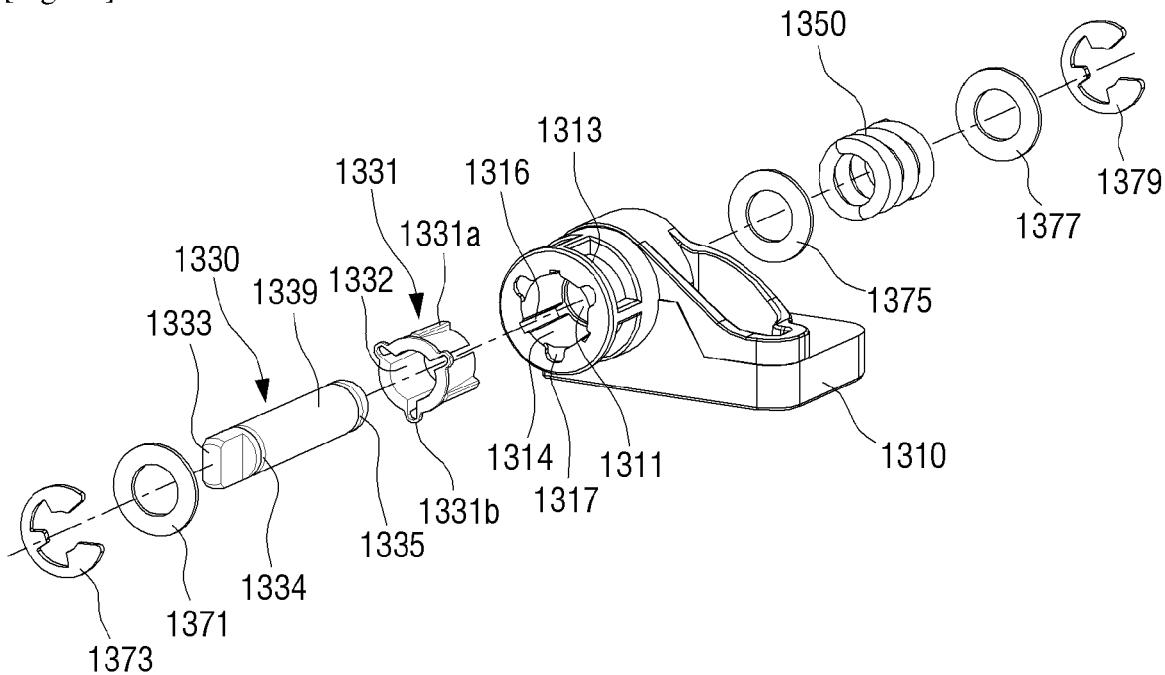

[Fig. 14]
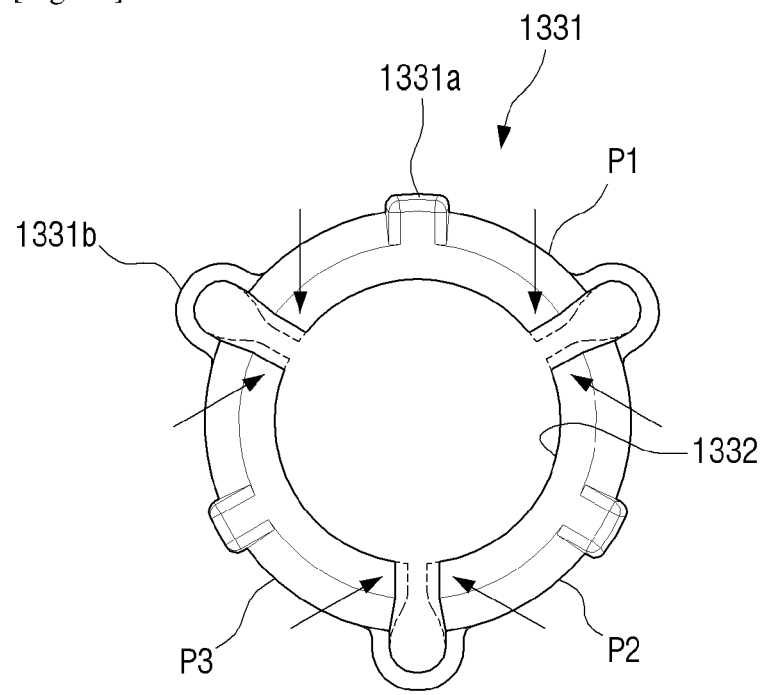
[Fig. 15]
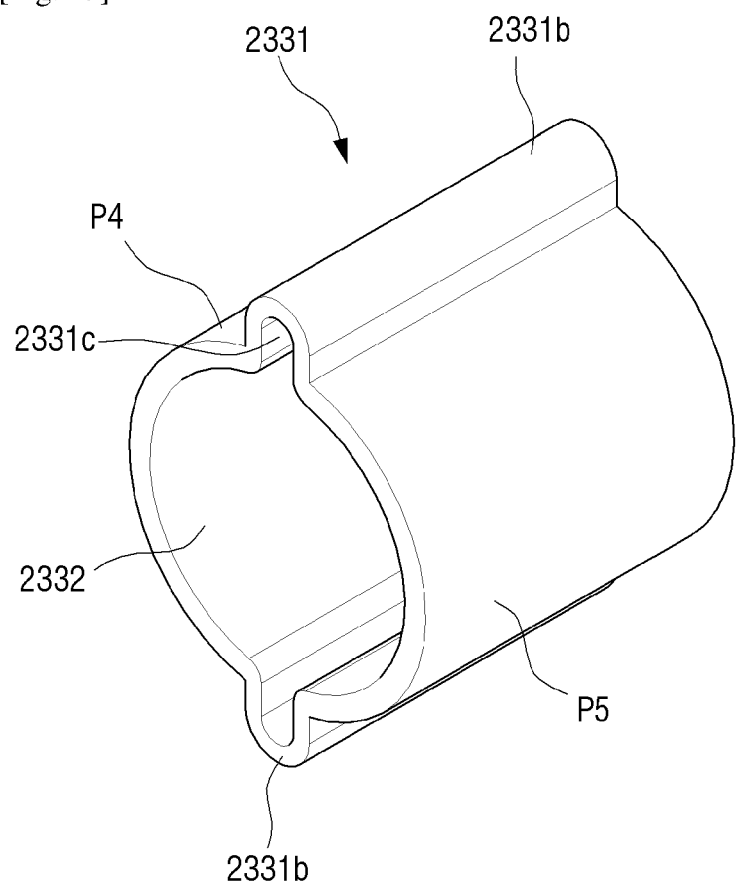

[Fig. 16]
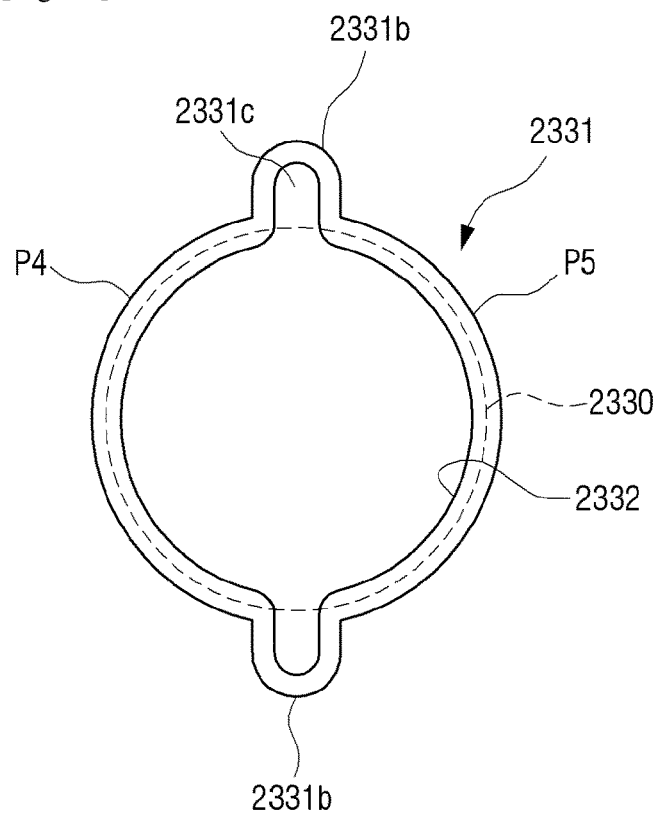
[Fig. 17]
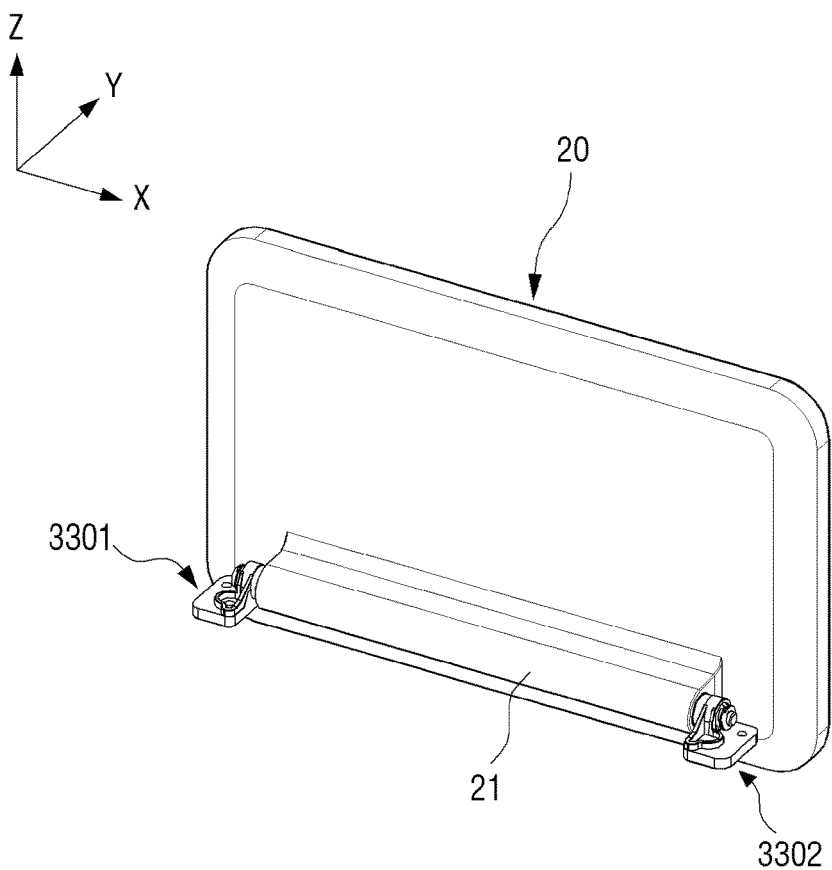

[Fig. 18]
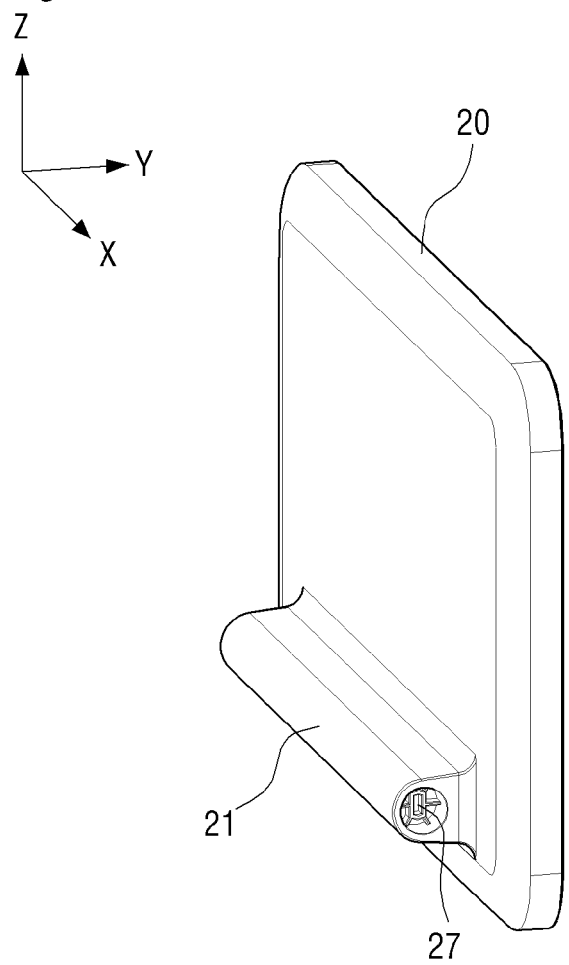

[Fig. 19]
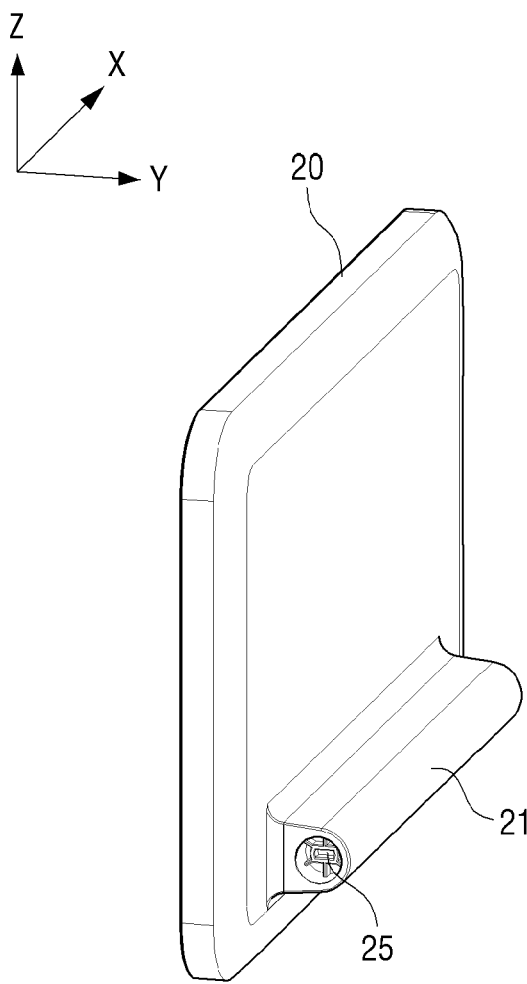

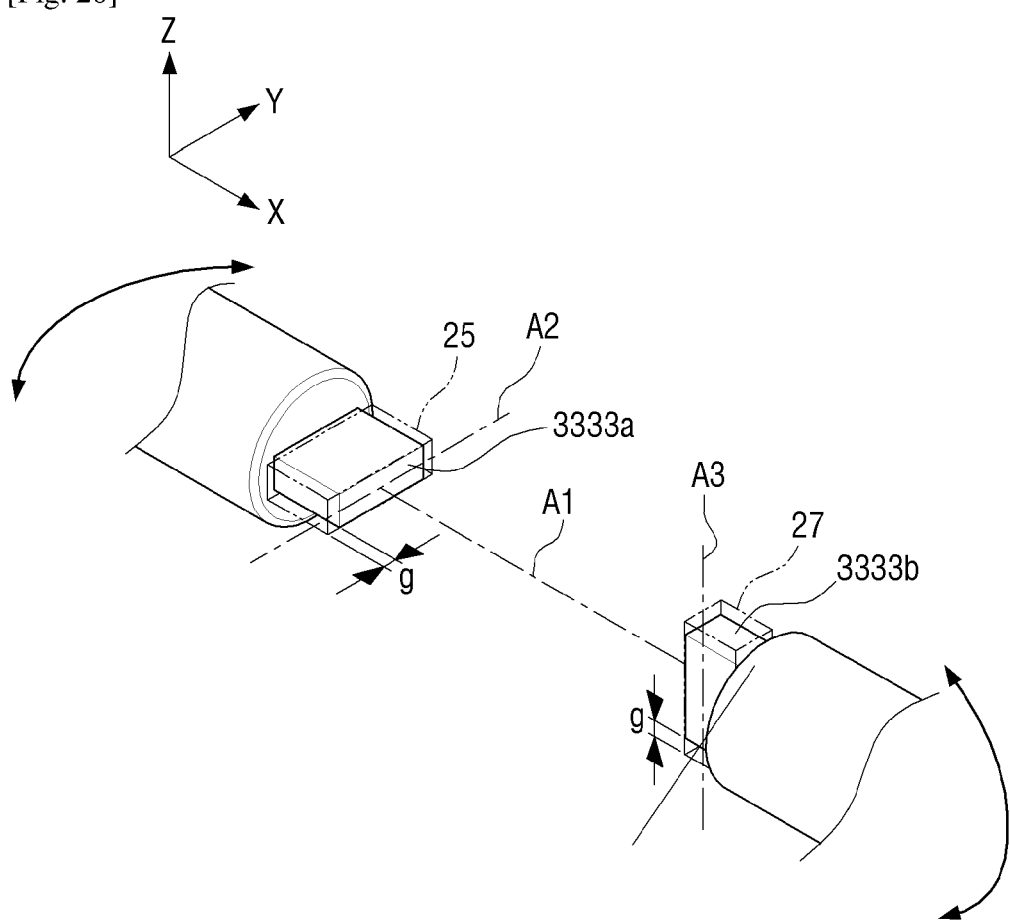
[Fig. 20]

[Fig. 21]
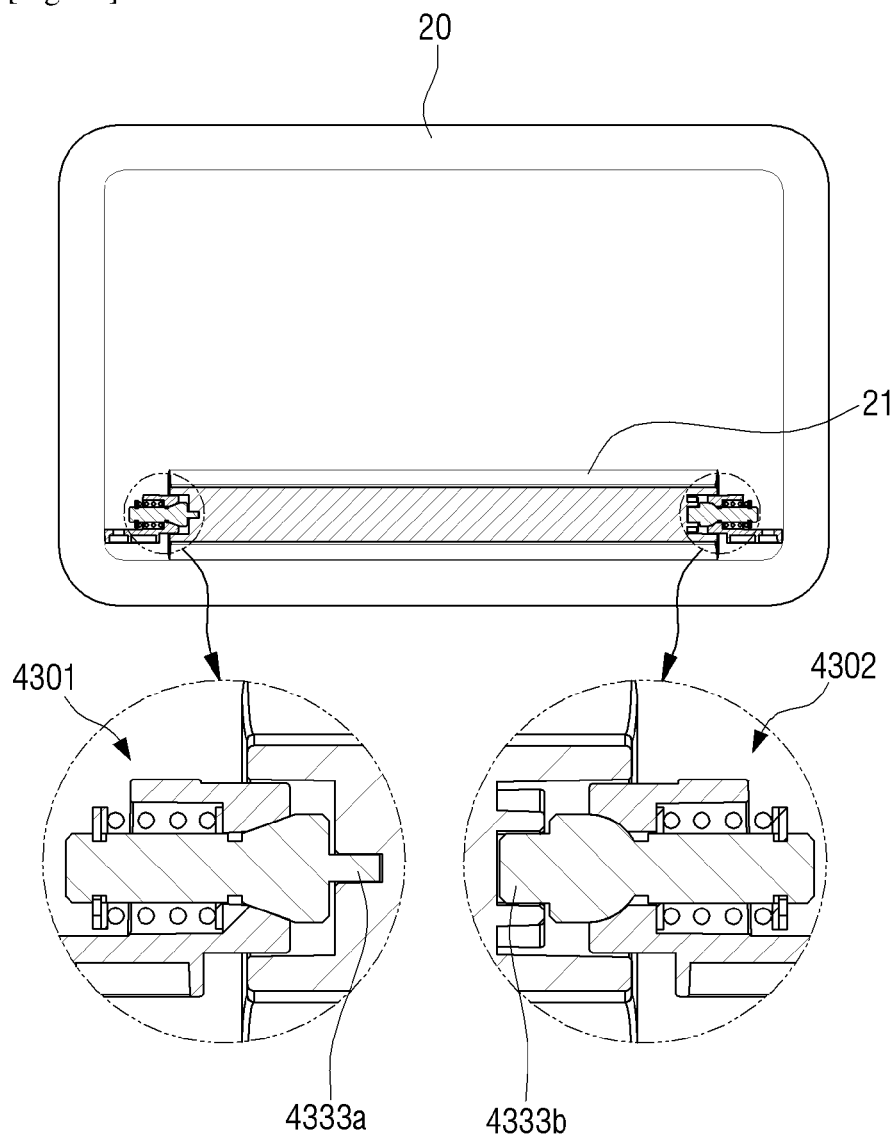

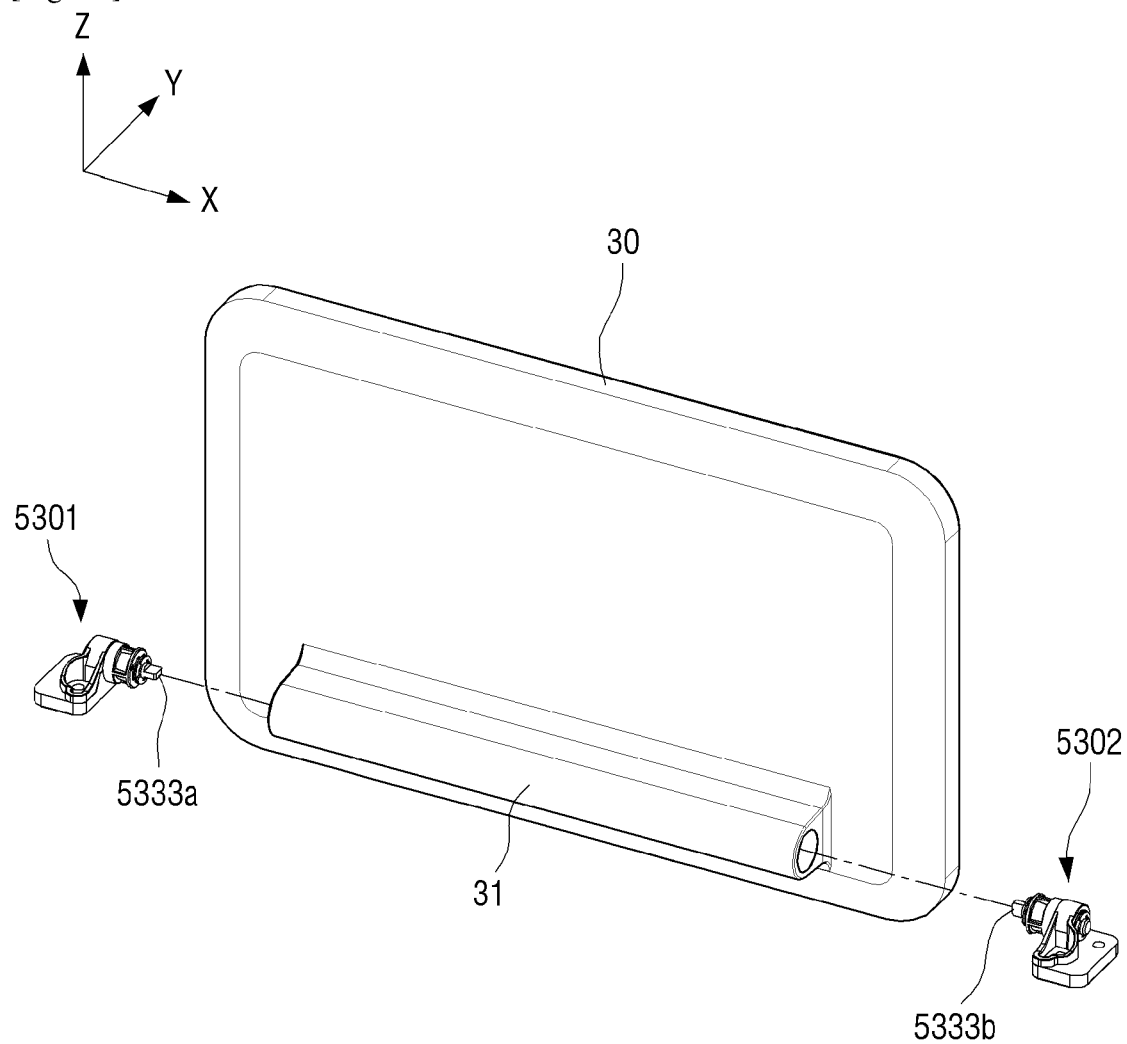
[Fig. 22]

FREE STOP BASED HINGE APPARATUS

BACKGROUND ART

In general, an image forming apparatus, such as a copier, a printer, or the like, includes a display that provides a user with information about various types of setting states, printing states, and the like.

Referring to FIG. 1, a display 7 is installed at a main body 3 of an image forming apparatus 1 through a support part 5. In this case, an angle of the display 7 may be variously changed on an axis 8 as shown in FIG. 2 so as to position a screen thereof within a viewing angle of a user. For this, the display 7 is connected to the support part 5 through a hinge that operates as the axis 8 and is freely stoppable.

However, an free stop hinge may have one axis but uses two axes if a rotation axis is far away. In this case, an eccentricity occurs between the two axes, and thus an axis alignment is required.

DISCLOSURE OF INVENTION

Brief Description of Drawings

The above and/or other aspects of the present disclosure will be more apparent by describing certain embodiments of the present disclosure with reference to the accompanying drawings, in which:

FIG. 1 is a perspective view of an image forming apparatus including a display;

FIG. 2 is a schematic view illustrating a state of the display of FIG. 1 that is freely stopped;

FIG. 3 is a perspective view illustrating a hinge apparatus that is disposed on a back surface of a display, according to an embodiment of the present disclosure.

FIG. 4 is a perspective view illustrating a rotation axis device and a side of an axis support part of a display with which the axis rotation device is combined;

FIG. 5 is a perspective view illustrating a free stop hinge device and an other side of the axis support part of the display with which the free stop hinge device is combined;

FIG. 6 is a cross-sectional view taken along a line VI-VI of FIG. 3;

FIG. 7 is an exploded perspective view of a free stop hinge device;

FIG. 8 is a cross-sectional view taken along a line VIII-VIII of FIG. 5;

FIG. 9 is a schematic view illustrating a state of a free stop hinge device that is movable up and down in order to align an axis by a gap formed in a combination groove of the axis support part into which a combination protrusion of a shaft of the free stop hinge device is combined;

FIG. 10 is a cross-sectional view of a free stop hinge device according to another embodiment of the present disclosure;

FIG. 11 is a plan view of a free stop hinge device according to another embodiment of the present disclosure;

FIG. 12 is a cross-sectional view taken along a line XII-XII of FIG. 11;

FIG. 13 is an exploded perspective view of the free stop hinge device of FIG. 11;

FIG. 14 is a front view of a friction member of FIG. 13;

FIG. 15 is a perspective view of a friction member according to another embodiment of the present disclosure;

FIG. 16 is a schematic view illustrating a difference between a diameter of the friction member of FIG. 15 and a diameter of a shaft combined with the friction member;

FIG. 17 is a perspective view illustrating free stop hinge devices that are respectively combined with both sides of an axis support part of a display;

FIGS. 18 and 19 are perspective views respectively illustrating a side and an other side of an axis support part of a display;

FIG. 20 is a schematic view illustrating fixing protrusions of a pair of free stop hinge devices that are respectively combined into fixing grooves of an axis support part of a display so as to be disposed toward directions orthogonal to each other;

FIG. 21 is an assembly cross-sectional view illustrating a free stop hinge device, as shown in FIG. 8, and a free stop hinge device, as shown in FIG. 10, that are respectively combined with a side and an other side of an axis support part of a display; and FIG. 22 is an exploded perspective view illustrating free stop hinge devices, as shown in FIG. 12, that are respectively combined with a side and an other side of an axis support part of a display.

MODE FOR THE INVENTION

Certain embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the embodiments of the present disclosure can be carried out without those specifically defined matters. Also, well-known functions or constructions are not described in detail since they would obscure the disclosure with unnecessary detail.

Embodiments of the present disclosure will be described with reference to the attached drawings in order to sufficiently understand a structure and an effect of the present disclosure. However, the present disclosure is not limited to embodiments that are disclosed hereinafter and thus may be embodied into several forms and various changes. Descriptions of the embodiments are provided in order to make the disclosure of the present disclosure complete and completely inform those skilled in the art about the scope of the present disclosure. Sizes of elements are enlarged and illustrated in the attached drawings for convenience of description, and ratios of the elements may be exaggerated or reduced.

Although the terms, 'first', 'second', etc. may be used herein to describe various elements regardless of orders and/or importances, these elements may not be limited by these terms. These terms are merely used to distinguish one element from another. For example, a first element may be termed a second element, and, similarly, a second element may be termed a first element, without departing from the scope of embodiments.

The singular expression also includes the plural meaning as long as it does not differently mean in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

Unless otherwise defined, all terms used herein have the same meaning as commonly understood by those skilled in the art to which embodiments belong.

In the present embodiment, an object that a hinge apparatus pivotably supports will be limitedly described as a display but is not limited thereto. Therefore, any particular object of which angle is required to be changed and maintained is not limited.

Hereinafter, a configuration of a hinge apparatus according to an embodiment of the present disclosure will be described in detail with reference to the attached drawings.

FIG. 3 is a perspective view of a hinge apparatus 100 that is disposed on a back surface of a display 10, according to an embodiment of the present disclosure. FIG. 4 is a perspective view illustrating a rotation axis device and a side of an axis support part of a display with which the rotation axis device is combined. FIG. 5 is a perspective view illustrating a free stop hinge device and an other side of the axis support part of the display with which the free stop hinge device is combined. FIG. 6 is a cross-sectional view taken along a line VI-VI of FIG. 3.

Referring to FIG. 3, the hinge apparatus 100 according to the present embodiment includes a rotation axis device 200 and a free stop hinge device 300 that are respectively combined with both sides of an axis support part 11 formed on the back surface of the display 10. Here, the display 10 may be installed at an image forming apparatus (not shown) so as to display various types of information about printing or the corresponding image forming apparatus.

Referring to FIG. 4, the rotation axis device 200 pivotably supports the side of the axis support part 11 so as to pivot the display 10.

The rotation axis device 200 includes a first fixing part 210 that is fixed to a main body (not shown) of the image forming apparatus and a first axis part 213 that extends from the first fixing part 210 so as to form a single body with the first fixing part 210.

A combination hole 211 through which a combination screw (not shown) penetrates is formed in the first fixing part 210 so as to enable the first fixing part 210 to be installed at a part of the main body of the image forming apparatus through the combination screw.

The first axis part 213 includes a curved protrusion 215 that convexly protrudes. The curved protrusion 215 protrudes from an outer circumference surface of the first axis part 213 having an approximately cylindrical shape along a radius direction of the first axis part 213.

Referring to FIG. 6, if the first axis part 213 is combined into a first combination groove 13 of the axis support part 11, the curved protrusion 215 may operate as a kind of ball bearing. Therefore, the first axis part 213 is combined into the first combination groove 13 of the axis support part 11 in a pivotable state.

As a result, when the rotation axis device 200 is assembled in the axis support part 11 of the display 10, a freedom degree of taking a posture of the display 10 at a desired angle is secured. Therefore, an eccentricity occurring between a central axis line of the rotation axis device 200 and a central axis line of the free stop hinge device 300 may be easily controlled. In this case, the first combination groove 13 has an inner circumference surface having a cylindrical shape. Here, an angle of the display 10 that is movable with respect to the rotation axis device 200 is a minute angle less than or equal to about 5 degrees.

Although not shown in the drawings, in the present embodiment, the curved protrusion 215 formed on the first axis part 213 having the cylindrical shape may be removed, and a curved protrusion may be formed so as to protrude toward a circumferential direction of a first combination groove along an inner circumference surface 14 of the first combination groove 13. Even in this case, the eccentricity occurring between the central axis line of the rotation axis device 200 and the central axis line of the free stop hinge device 300 may be easily controlled as described above.

The rotation axis device 200 may be formed of a synthetic resin or a metallic material having a preset hardness.

Referring to FIG. 5, the free stop hinge device 300 pivotably supports an other side of the axis support part 11 so as to pivot the display 10.

In this case, a second axis part 313 that will be described later is inserted into a second combination groove 15 of the axis support part 11, and a fixing protrusion 333 formed at a front end of a shaft 330 that will be described later is inserted into a fixing groove 17 positioned inside the second combination groove 15. Therefore, if the display 10 pivots, the shaft 330 pivots along with the display 10. Here, the display 10 may maintain a fixed state thereof at a desired angle by a frictional force occurring between the second axis part 313 and the shaft 330.

Hereinafter, a configuration of the free stop hinge device 300 will be described in detail with reference to FIGS. 7 and 8.

The free stop hinge device 300 includes a second fixing part 310 that is fixed to the main body of the image forming apparatus and the second axis part 313 that extends from the second fixing part 310 so as to form a single body with the second fixing part 310.

A combination hole 301 through which a combination screw (not shown) penetrates is formed in the second fixing part 310 so as to enable the second fixing part 310 to be installed at a part of the main body of the image forming apparatus through the combination screw.

A combination hole 311 is formed inside a front end of the second axis part 313 so as to penetrate on a central axis line of the second axis part 313, and a housing groove 315 is formed inside a back end of the second axis part 313 so as to house an elastic member 350.

An inner circumference surface 312 is formed in the combination hole 311 so as to have a corn shape of which a diameter becomes gradually smaller from the front end of the second axis part 313 (i.e., a side of the second axis part 313 combined into the second combination groove 15 of the axis support part 11) toward the back end of the second axis part 313. If the shaft 330 pivots when an outer circumference surface 332 of a friction part 331 that will be described later contacts the inner circumference surface 312 of the combination hole 311, a frictional force occurs between the outer circumference surface 332 of the friction part 331 and the inner circumference surface 312 of the combination hole 311. Here, if the frictional force occurring between the outer circumference surface 332 of the friction part 331 and the inner circumference surface 312 of the combination hole 312 is larger than a weight of the display 10, a free stop function of changing and fixing the display 10 at a desired angle may be realized.

A fixing protrusion 333 and the friction part 331 inserted into the combination hole 311 of the second axis part 313 are formed at a front end of the shaft 330, and a groove 335 with which an E-ring 375 is combined is formed in a back end of the shaft 330.

As the fixing protrusion 333 is inserted into a fixing groove 17 positioned inside the second combination groove 15, the shaft 330 pivots together when the display 10 pivots.

The friction part 331 may be formed in an approximately corn shape of which a diameter becomes gradually smaller from the front end of the shaft 330 toward the back end of the shaft 330. In this case, the shape of the friction part 331 corresponds to a shape of the inner circumference surface 312 of the combination hole 311. The outer circumference surface 332 of the friction part 331 may have an angle θ (refer to FIG. 8) enough to trap the friction part 331 in the combination hole 311 so as not to enable the friction part 331 to escape from the combination hole 311 by an elastic force of the elastic member 350.

Referring to FIG. 8, a coil spring may be used as the elastic member 350, and an elastic member and a coil spring may be denoted by the same reference numeral hereinafter. The coil spring 350 is disposed in the housing groove 315 of the second axis part 313, and a part of the shaft 330 is inserted into the coil spring 350. The coil spring 350 is not separated from the shaft 350 by the E-ring 375 and simultaneously produces an elastic force toward a direction A marked with an arrow (i.e. toward a direction going from the front end of the shaft 330 to the back end of the shaft 330). This elastic force enables the outer circumference surface 332 of the friction part 331 to pressurize and contact the inner circumference surface 312 of the combination hole 311. The elastic force of the coil spring 350 required in this case may realize a free stop function merely if the frictional force occurring between the outer circumference surface 332 of the friction part 331 and the inner circumference surface 312 of the combination hole 311 is larger than the weight of the display 10.

The shaft 330 is pulled by the coil spring 35 toward the direction A marked with the arrow at all times. Therefore, when the free stop hinge device 300 is used for a long time, the outer circumference surface 332 of the friction part 331 and the inner circumference surface 312 of the combination hole 311 mutually evenly wears down. Also, as the shaft 330 moves toward the direction A marked with the arrow by a worn degree, the outer circumference surface 332 of the friction part 331 and the inner circumference surface 312 of the combination hole 311 keep a mutual contact area in a maximum state. Therefore, a replacement of the shaft 330, which results from lowering of a frictional force caused by a one-sided wear, is not needed.

If an end and an other end of the coil spring 350 is not processed to be sharp or plane, a one-sided concentration phenomenon of a weight of the coil spring 350 wears down a structure (i.e., an inner surface of the housing groove 315 or a surface of the E-ring 375), which elastically supports the end and the other end of the coil spring 350, when the display 10 pivots. In order to prevent this, a first washer 371 and a second washer 373 are respectively disposed at the end and the other end of the coil spring 350. In detail, the first washer 371 is disposed between the end of the coil spring 350 and the inner surface of the housing groove 315 (e.g., a surface corresponding to a surrounding part of the combination hole 311), and the second washer 373 is disposed between the other end of the coil sprint 350 and the E-ring 375.

Referring to FIG. 9, a length of the fixing groove 17 is longer than a width of the fixing protrusion 333. As a result, gaps g having preset lengths are respectively formed between an upper end of the fixing protrusion 333 and an upper end of the fixing groove 17 and between a lower end of the fixing protrusion 333 and a lower end of the fixing groove 17. Therefore, the free stop hinge device 300 may pivot by a preset angle (i.e., less than or equal to about 5 degrees) toward direction Z (i.e., in upper and lower directions) by using axis Y as a rotation center. Therefore, when the free stop hinge device 300 is assembled with an other side of the axis support part 11, the eccentricity occurring between the central axis line of the free stop hinge device 300 and the central axis line of the rotation axis device 200 may be easily controlled.

A part forming the free stop hinge device 300, i.e., the second axis part 313 forming a single body with the second fixing part 310, may be formed of a synthetic resin or a metallic material having a preset hardness. Also, the shaft 330, the elastic member 350, the first and second washers 371 and 373, and the E-ring 375 may be formed of metallic materials.

The friction part 331 of the shaft 330 may have a cross-section having a curved shape as shown in FIG. 10 besides the corn shape. FIG. 10 is a cross-sectional view of a free stop hinge device 300a according to another embodiment of the present disclosure.

Referring to FIG. 10, most of elements of the free stop hinge device 300a are the same as those of the free stop hinge device 300 described above. The same elements of the free stop hinge device 300a as elements of the free stop hinge device 300 described above are denoted by the same reference numerals, and their detailed descriptions are omitted.

A shaft 330a of the free stop hinge device 300a includes a friction part 331a having an outer circumference surface 332a that is formed as a convex curved surface. An inner circumference surface 312a of a combination hole of a second axis part 313, which produces a friction with the outer circumference surface 332a of the friction part 331a, is formed as a concave curved surface so as to correspond to a shape of the outer circumference surface 332a of the friction part 331a.

If the outer circumference surface 332a of the friction part 331a and the inner circumference surface 312a of the combination hole are formed as curved surfaces corresponding to each other, a friction area between the outer circumference surface 332a of the friction part 331a and the inner circumference surface 312a of the combination hole increases more than the friction area between the outer circumference surface 332 of the friction part 331 having the corn shape described above and the inner circumference surface 312 of the combination hole 311. Therefore, this may produce a frictional force larger than a frictional force occurring on a vertical friction surface of an free stop hinge.

Hereinafter, a configuration of a free stop hinge device 1300 capable of generating a larger frictional force than the frictional force occurring from the free stop hinge device 300a of FIG. 10 will be described with reference to FIGS. 11 through 15.

FIG. 11 is a plan view of a free stop hinge device according to another embodiment of the present disclosure. FIG. 12 is a cross-sectional view taken along a line XII-XII of FIG. 11. FIG. 13 is an exploded perspective view of the free stop hinge device of FIG. 11. FIG. 14 is a front view of a friction member of FIG. 13.

The free stop hinge device 1300 includes a second fixing part 1310 that is fixed to the main body (not shown) of the image forming apparatus and a second axis part 1313 that extends from the second fixing part 1310 to form a single body with the second fixing part 1310.

A combination hole 1301 through which a combination screw (not shown) penetrates is formed in the second fixing part 1310 so as to enable the second fixing part 1310 to be installed at a part of the main body of the image forming apparatus through the combination screw.

A combination hole 1311 that penetrates on a central axis line of the second axis part 1313 is formed inside a front end of the second axis part 1313, and a housing groove 1315 that houses an elastic member 1350 is formed inside a back end of the second axis part 1313.

An inner circumference surface 1314 is formed in the combination hole 1311 so as to have an approximately corn shape of which a diameter becomes gradually smaller from the front end of the second axis part 1313 toward the back end of the second axis part 1313. A plurality of first insertion grooves 1316 are formed in the inner circumference surface 1314 at the same intervals toward a longitudinal direction of the combination hole 1311. A plurality of insertion grooves 1317 are formed in the front end of the combination hole 1311 at the same intervals toward a radial direction. The number of the plurality of first insertion grooves 1316 is the same as the number of the plurality of second insertion grooves 1317.

Referring to FIG. 14, a friction member 1331 includes first, second, and third parts P1, P2, and P3 that are divided at equal intervals so as to be reduced when being inserted into the combination hole 1311. Here, the "reduction" means that a whole size of the friction member 1331 is reduced as first through third parts move preset distances toward a center of the friction member 1331.

Insertion protrusions 1331*a* that are respectively inserted into the first insertion grooves 1316 of the combination hole 1311 are respectively formed on outer circumference surfaces of the first, second, and third parts P1, P2, and P3. If a plurality of insertion protrusions 1331*a* are inserted into the plurality of first insertion grooves 1316 when the friction member 1331 is inserted into the combination hole 1311, the friction member 1331 does not pivot when a shaft 1330 pivots along with the display 10. Here, a frictional force occurs between the shaft 1330 and the friction member 1331, and a free stop function may be realized by using the frictional force.

Also, the first, second, and third parts P1, P2, and P3 are connected to one another by a plurality of connection ribs 1331*b*, of which adjacent parts have elastic forces, so as not to be completely separated from one another. The plurality of connection ribs 1331 may be respectively inserted into the plurality of second insertion grooves 1317 of the friction member 1331.

Referring to FIG. 13, a fixing protrusion 1333 and a first groove 1334 into which a first E-ring 1373 is combined are formed at a front end of the shaft 1330, and a second groove 1335 into which a second E-ring 1379 is combined is formed in a back end of the shaft 1330.

As the fixing protrusion 1333 is inserted into the fixing groove 17 positioned inside the second combination groove 15 of the axis support part 11, the shaft 1330 pivots together when the display 10 pivots.

Referring to FIG. 12, the shaft 1330 is combined with the second axis part 1313 in a state of penetrating through the friction member 1331. In this case, the first E-ring 1373 prevents the friction member 1331 from deviating from the shaft 1330. The first washer 1371 may be positioned between the friction member 1331 and the first E-ring 1373.

Like the elastic member 350 described above, a coil spring may be used as the elastic member 1350, and an elastic member and a coil spring are denoted by the same reference numeral.

The coil spring 1350 is disposed in the housing groove 1315 of the second axis part 1313, and a part of the shaft 1330 is inserted into the coil spring 1350. The coil spring 1350 is not separated from the shaft 1330 by the second E-ring 1379 and simultaneously produces an elastic force toward a direction B marked with an arrow (i.e., a direction going from a front end of the shaft 1330 toward a back end of the shaft 1330).

The friction member 1331 is pressurized toward the direction B marked with the arrow by the elastic force of the coil spring 1350. Therefore, as gaps between the first, second, and third parts P1, P2, and P3 of the friction member 1331 becomes narrower, inner circumference surfaces 1332 of the first, second, and third parts P1, P2, and P3 pressurize and contact the outer circumference surface 1339 of the shaft 1330. The elastic force of the coil spring 1350 required in this case may satisfy a case where a frictional force occurring between the outer circumference surface 1339 of the shaft 1330 and the first, second, and third parts P1, P2, and P3 of the friction member 1331 is larger than the weight of the display 10. If this case is satisfied, the free stop hinge device 1300 may perform a function thereof.

If an end and an other end of the coil spring 1350 are not processed to be sharp or plane, a one-sided concentration phenomenon of a weight of the coil spring 1350 wears down a structure, which elastically supports the end and the other end of the coil spring 1350 (e.g., an inner surface of the housing groove 1315 or a surface of the second E-ring 1379), when the display 10 pivots. In order to prevent this, a second washer 1375 and a third washer 1377 are respectively disposed at the end and the other end of the coil spring 1350. In detail, the second washer 1375 is disposed between the end of the coil spring 1350 and the inner surface of the housing groove 1315 (e.g., a surface corresponding to a surrounding part of the combination hole 1311), and the third washer 1377 is disposed between the other end of the coil spring 1350 and the second E-ring 1379.

The free stop hinge device 1300 constituted as described above produces a frictional force that acts toward a circumferential direction of the shaft 1330 when the display 10 pivots and generates a friction area that are larger than friction areas generated by the free stop hinge devices 300 and 300*a* described above. Therefore, if the free stop hinge device 1300 is applied, a free stop function of a display, which has a larger size than displays of the free stop hinge devices 300 and 300*a* described above, may be sufficiently realized.

The friction member 1331 is formed so as to be dived into a plurality of parts P1, P2, and P3 but is limited thereto. Therefore, a friction member 2331 including two parts connected to each other by connection ribs 2331*b* may be provided as shown in FIG. 15.

FIG. 15 is a perspective view of the friction member 2331 according to another embodiment of the present disclosure. FIG. 16 is a schematic view illustrating a difference between a diameter the friction member 2331 of FIG. 15 and a diameter of a shaft combined with the friction member 2331.

Referring to FIG. 15, the friction member 2331 according to the present embodiment has a cylindrical shape, and two parts P4 and P5 are connected to each other by a pair of connection ribs 2331*b*, which are disposed to be opposite to each other, so as to be reduced.

The pair of connection ribs 2331 are respectively formed toward longitudinal directions of the parts P4 and P5, and preset spaces 2331*c* are formed in the pair of connection ribs 2331*b*. The pair of connection ribs 2331*b* are combined into a pair of insertion grooves (not shown) formed in an inner circumference surface of a combination hole of a second axis part so as to prevent the friction member 2331 from pivoting in the insertion groove of the combination hole. As described above, the pair of connection ribs 2331*b* of the friction member 2331 also perform a function of the insertion protrusion 1331a of the friction member 1331 described above.

Referring to FIG. 16, an internal diameter of the friction member 2331 may be smaller than an external diameter of a shaft 2330. If the shaft 2330 is inserted into the friction member 2331 when the friction member 2331 is inserted into the combination hole, the parts P4 and P5 of the friction member 2332 are pressurized by pressure generated between the friction member 2331 and the shaft 2330 when the friction member 2331 and the shaft 2330 are combined with each other. As a result, inner circumference surfaces 2332 of the parts P4 and P5 are pressurized by and contact an outer circumference surface of the shaft 2330.

Therefore, as a frictional force occurs between the shaft 2330 and the friction member 2331 when pivoting the display 10 to which the friction member 2331 is applied, a free stop function may be realized.

As the friction member 2331 is formed in a cylindrical shape, a coil spring for pressurizing the friction member 2331 toward one direction does not need to be applied. Since the coil spring is omissible described above, a plurality of washers and a plurality of E-rings may be omitted.

As described above, a hinge apparatus that supports the display 10 so as to freely stop the display 10 may apply a rotation axis device having no free stop hinge function and a free stop hinge device together.

FIG. 17 is a perspective view illustrating free stop hinge devices that are respectively combined with both sides of an axis support part of a display. FIGS. 18 and 19 are perspective views respectively illustrating a side and an other side of the axis support part of the display. FIG. 20 is a schematic view illustrating fixing protrusions of a pair of free stop hinge devices that are respectively combined into fixing grooves of the axis support part of the display so as to be disposed in directions orthogonal to each other.

A weight of a display 20 having a larger size than the display 10 described above is heavier than a weight of the display 10. In order to support the display 20 having the heavier weight, first and second free stop hinge devices 3301 and 3302 may be displayed at both sides of an axis support part 21 as shown in FIG. 17. Here, the first and second free stop hinge devices 3301 and 3302 have the same configurations as the free stop hinge device 300 of FIG. 8.

In this case, when the first and second free stop hinge devices 3301 and 3302 are assembled with the both sides of the axis support part 21, first and second fixing grooves 25 and 27 formed in the axis support part 21 are formed to be orthogonal to each other so as to control an eccentricity of a central axis line of each of the first and second free stop hinge devices 3301 and 3302. In other words, the first fixing groove 25 of the axis support part 21 is formed along axis Y as shown in FIG. 18, and the second fixing groove 27 of the axis support part 21 is formed along axis Z as shown in FIG. 19.

Therefore, fixing protrusions 3333a and 3333b of the first and second free stop hinge devices 3301 and 3302 are respectively combined into the first and second fixing grooves 25 and 27 so as to be disposed in directions orthogonal to each other as shown in FIG. 20.

Here, as a length of the first fixing groove 25 is longer than a width of the first fixing protrusion 333a, gaps g having preset lengths are formed between both ends of the first fixing protrusion 333a and both ends of the first fixing groove 25. Also, as a length of the second fixing groove 27 is longer than a width of the second fixing protrusion 3333b, gaps g having preset lengths are formed between upper and lower ends of the second fixing protrusion 3333b and both ends of the second fixing groove 27.

Therefore, the first free stop hinge device 3301 may pivot at a preset angle (i.e., less than or equal to about 5 degrees) toward the axis Y (i.e., in left and right directions) by using the axis Z as a rotation center. The second free stop hinge device 3302 may pivot at a preset angle (i.e., less than or equal to about 5 degrees) toward the axis Z (i.e., in upper and lower directions) by using the axis Y as a rotation center. As a result, when assembling the first and second free stop hinge devices 3301 and 3302 with the both sides of the axis support part 21, the eccentricity with each of the central axis lines of the first and second free stop hinge devices 3301 and 3302 may be easily controlled.

FIG. 21 is an assembly cross-sectional view illustrating a free stop hinge device, as shown in FIG. 8, and a free stop hinge device, as shown in FIG. 10, that are respectively combined with a side and an other side of an axis support part of a display.

Referring to FIG. 21, third and fourth free stop hinge devices 4301 and 4302 having different configurations may be respectively combined with both sides of the axis support part 21 of the display 20.

The third free stop hinge device 4301 has the same configuration as the free stop hinge device 300 of FIG. 8, and the fourth free stop hinge device 4302 has the same configuration as the free stop hinge device 300a of FIG. 10. In this case, fixing protrusions 4333a and 4333b are respectively disposed at the third and fourth free stop hinge devices 4301 and 4302 so as to be orthogonal to each other in order to control an eccentricity.

FIG. 22 is an exploded perspective view illustrating free stop hinge devices, as shown in FIG. 12, that are respectively combined with a side and an other side of an axis support part of a display.

Referring to FIG. 22, fifth and sixth free stop hinge devices 5301 and 5302 having the same configurations may be respectively combined with both sides of an axis support part 31 of a display 30.

The fifth and sixth free stop hinge devices 5301 and 5302 have the same configurations as the free stop hinge device 1300 of FIG. 12. In this case, fixing protrusions 5333a and 5333b are respectively disposed at the fifth and sixth free stop hinge devices 5301 and 5302 so as to be orthogonal to each other in order to control an eccentricity.

As described above, if a hinge apparatus of the present disclosure includes a pair of free stop hinge devices, the pair of free stop hinge devices may have the same configurations or different configurations.

Also, a shaft of a free stop hinge device may be formed of a metallic material, a friction member of the free stop hinge device may be formed of a metallic material or a synthetic resin having a preset elastic force, and a second fixing part of the free stop hinge device may be formed of a metallic material or a synthetic resin having a preset elastic force.

The foregoing embodiments and advantages are merely and are not to be construed as limiting the present disclosure. The present teaching can be readily applied to other types of apparatuses. Also, the description of the embodiments of the present disclosure is intended to be illustrative, and not to limit the scope of the claims, and many alternatives, modifications, and variations will be apparent to those skilled in the art.

The invention claimed is:

1. A hinge apparatus comprising:
an axis support part including:
a first combination groove located on a first side of the axis support part,
a second combination groove located on a second side of the axis support part, the second side being opposite the first side, and
a fixing groove located inside the second combination groove, the fixing groove having a length;
a rotation axis device received in the first combination groove of the axis support part; and
a free stop hinge device including:
a rotatable shaft that extends from a first end of the free stop hinge device and includes a fixing protrusion received in the fixing groove located inside the second combination groove of the axis support part, the fixing protrusion having a width that is shorter than the length of the fixing groove to form a gap between an upper end of the fixing protrusion and an upper end of the fixing groove, and
an elastic member located in a housing groove at a second end of the free stop hinge device, the second end opposite the first end, the elastic member applying a pressure to move the rotatable shaft in a direction toward the second end of the free stop hinge device.

2. The hinge apparatus of claim 1, wherein the rotation axis device comprises:
a first fixing part; and
a first axis part extending from the first fixing part and received in the first combination groove of the axis support part,
wherein the first axis part includes a convexly curved protrusion protruding in a circumferential direction of the first axis part and contacting an inner circumferential surface of the first combination groove.

3. The hinge apparatus of claim 2, wherein the free stop hinge device comprises:
a second fixing part; and
a second axis part receiving the rotatable shaft,
wherein the rotatable shaft includes a friction part inserted into a combination hole of the second axis part, and
wherein the elastic member applies the pressure to move the rotatable shaft in the direction toward the second end of the free stop hinge device so an outer circumferential surface of the friction part contacts an inner circumferential surface of the combination hole of the second axis part.

4. The hinge apparatus of claim 3, wherein the combination hole of the second axis part has a first shape and the friction part of the rotatable shaft has a second shape, the first shape corresponding to the second shape.

5. The hinge apparatus of claim 3, wherein an internal diameter of the combination hole of the second axis part and an external diameter of the friction part of the rotatable shaft become smaller from the first end of the free stop hinge device toward the second end of the free stop hinge device.

6. The hinge apparatus of claim 5, wherein the internal diameter of the combination hole of the second axis part and the external diameter of the friction part of the rotatable shaft become smaller from the first end of the free stop hinge device toward the second end of the free stop hinge device in a linear manner so that an outer edge of a cross-section of the combination hole of the second axis part and an outer edge of a cross-section the friction part of the rotatable shaft each forms a straight line.

7. The hinge apparatus of claim 5, wherein the internal diameter of the combination hole of the second axis part and the external diameter of the friction part of the rotatable shaft become smaller from the first end of the free stop hinge device toward the second end of the free stop hinge device in a non-linear manner so that an outer edge of a cross-section of the combination hole of the second axis part forms a concave curved line, and an outer edge of a cross-section of the friction part of the rotatable shaft forms a convex curved line.

8. The hinge apparatus of claim 3,
wherein the elastic member includes a coil spring into which a part of the rotatable shaft is inserted, and
wherein an end of the coil spring is received in the housing groove located in the combination hole of the second axis part, and an opposite end of the coil spring is supported by a fixing member combined with an end of the rotatable shaft.

9. An image forming apparatus comprising:
a display; and
a hinge apparatus supporting the display,
wherein the hinge apparatus includes:
an axis support part including a first combination groove located on a first side of the axis support part, a second combination groove located on a second side of the axis support part, the second side being opposite the first side, and a fixing groove located inside the second combination groove, the fixing groove having a length;
a rotation axis device received in the first combination groove of the axis support part; and
a free stop hinge device including a rotatable shaft extending from a first end of the free stop hinge device, the rotatable shaft including a fixing protrusion received in the fixing groove located inside the second combination groove of the axis support part, wherein the fixing protrusion has a width that is shorter than the length of the fixing groove to form a gap between an upper end of the fixing protrusion and an upper end of the fixing groove, and
an elastic member located externally of the axis support part and at a second end of the free stop hinge device, the second end opposite the first end, the elastic member applying a pressure to move the rotatable shaft toward the second end of the free stop hinge device.

10. The hinge apparatus of claim 8, further comprising a groove located at the end of the rotatable shaft, wherein the fixing member is received in the groove.

11. The hinge apparatus of claim 10, wherein the fixing member includes a washer and an E-ring.

12. The hinge apparatus of claim 1, wherein the housing groove is located externally of the axis support part.

* * * * *